H. R. Heyl,

Table.

No. 4118. Reissued Sept. 13. 1870.

Witnesses:

John Chartton,
E. Oscar Haupthman

Inventor.

H. R. Heyl.

N. PETERS, PHOTO-LITHOGRAPHER, WASHINGTON, D. C.

United States Patent Office.

HENRY R. HEYL, OF PHILADELPHIA, PENNSYLVANIA.

*Letters Patent No.* 104,151, *dated June* 14, 1870; *antedated May* 30, 1870; *reissue No.* 4,118, *dated September* 13, 1870.

IMPROVEMENT IN CROQUET-TABLES.

The Schedule referred to in these Letters Patent and making part of the same.

*To all whom it may concern:*

Be it known that I, HENRY R. HEYL, of the city and county of Philadelphia and State of Pennsylvania, have invented new and useful Improvements in Croquet-Tables; and I do hereby declare the following to be a clear and exact description thereof, sufficient to enable others skilled in the art to which my invention appertains to fully understand and use the same, reference being had to the accompanying drawing making part of this specification, in which—

Similar letters of reference indicate corresponding parts in the two figures.

Figure 1:
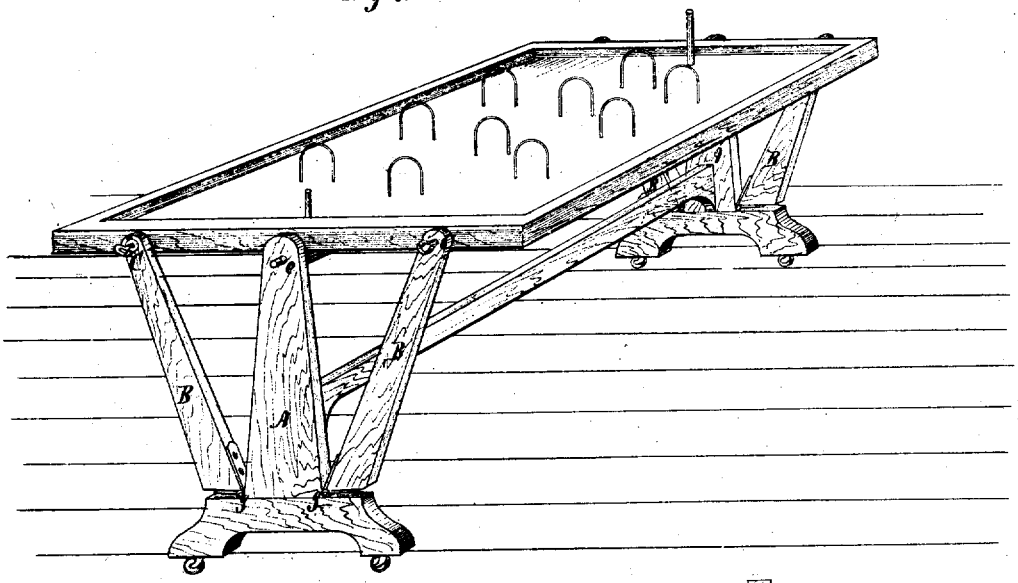
Figure 1 is a perspective view of the table as arranged for use.
Figure 2:
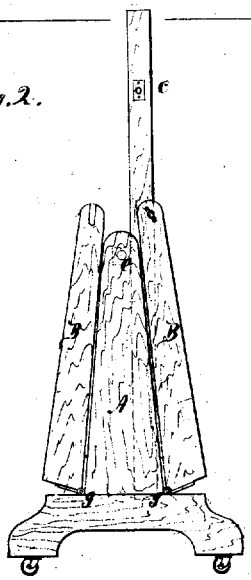
Figure 2 is an end view thereof in a closed state.

My invention is a portable folding croquet-table, containing the fixtures of croquetry.

It also consists in the manner of hanging the table.

It further consists in a series of braces which retain the table in a horizontal position, and afford means for careful adjustment thereof.

In the drawing—

D represents a table or board with raised or flanged edges, and having secured thereto or arranged thereon the bridges and other fixtures of the game of croquet.

This table is provided at its ends with trunnions or axes E E projecting therefrom, and hung by said axes on the uprights A A of a frame-work, which, in the present case, consists of feet or pedestals united together by a longitudinal cross-bar, and support said uprights.

It will be seen that the table may be swung in horizontal and vertical positions. When swung in the latter position, it is folded or closed, and rests between the uprights A A, and may thus be swung to the right or left without interference with other parts.

When the board is placed in a horizontal position it is ready for use. In order to retain it thus, I employ braces B B, which are hinged at their lower ends to the feet or pedestals, or to the uprights, and their upper ends preferably branch out or radiate, and are slotted to receive set or thumb-screws *c c*, which pass through the slots into the ends of the board.

The board may thus also be nicely and carefully adjusted to assume a truly horizontal position, regardless of the inequalities of the floor or other place of rest.

When the braces are released they fold in toward the standards A A, and the board is swung in a vertical position. In this condition the croquet-table forms a compact bundle, readily removable, either for transportation or disuse.

Having thus described my invention,

What I claim as new, and desire to secure by Letters Patent, is—

1. The table, carrying a series of croquet-bridges supported upon the uprights A A, and adapted to be turned or folded on both sides between the supporting frame, substantially as set forth.

2. The combination, with the hinged croquet-board, of the braces B, for holding the board in a horizontal position, and forming the adjusting medium thereof, substantially as set forth.

3. The combination, with a folding croquet-board, of the braces B, hinged at one of their ends to the supporting frame, and provided at their other end with adjusting screws *c c*, as and for the purpose described.

HENRY R. HEYL.

Witnesses:

A. B. STOVELL,

E. OSCAR HAEUPTNER.